(12) United States Patent
Lee et al.

(10) Patent No.: US 7,797,617 B2
(45) Date of Patent: Sep. 14, 2010

(54) INTERLEAVING METHOD IN OFDM SYSTEM

(75) Inventors: Jeong-sang Lee, Seoul (KR);
Sung-hyun Chung, Seongnam-si (KR);
Jae-min Ahn, Yongin-si (KR);
Min-joong Rim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1345 days.

(21) Appl. No.: 11/268,473

(22) Filed: Nov. 8, 2005

(65) Prior Publication Data

US 2006/0164973 A1 Jul. 27, 2006

(30) Foreign Application Priority Data

Jan. 27, 2005 (KR) .................. 10-2005-007459

(51) Int. Cl.
*H03M 13/03* (2006.01)
(52) U.S. Cl. .................. 714/790; 714/752; 714/763; 714/792
(58) Field of Classification Search .................. 714/790, 714/752, 712, 780, 746, 749, 792, 763; 370/343, 370/203, 241, 244
See application file for complete search history.

(56) References Cited

U.S. PATENT DOCUMENTS

| | | | | |
|---|---|---|---|---|
| 6,108,810 A * | 8/2000 | Kroeger et al. | .............. | 714/790 |
| 6,158,041 A * | 12/2000 | Raleigh et al. | .............. | 714/792 |
| 6,278,685 B1 * | 8/2001 | Yonge et al. | .............. | 370/203 |
| 6,904,550 B2 * | 6/2005 | Sibecas et al. | .............. | 714/714 |
| 7,317,680 B2 * | 1/2008 | Ma et al. | .............. | 370/203 |
| 7,376,117 B2 * | 5/2008 | Erlich et al. | .............. | 370/343 |
| 7,577,122 B1 * | 8/2009 | Schultz et al. | .............. | 370/338 |
| 2003/0053410 A1 | 3/2003 | Williams et al. | | |
| 2005/0180332 A1 * | 8/2005 | Kim et al. | .............. | 370/244 |

FOREIGN PATENT DOCUMENTS

JP 2002-217861 A 8/2002

* cited by examiner

*Primary Examiner*—Fritz Alphonse
(74) *Attorney, Agent, or Firm*—Sughrue Mion, PLLC

(57) ABSTRACT

Provided is an interleaving method that can reduce error occurring during transmission at a receiving end in an Orthogonal Frequency Division Multiplexing (OFDM) system. According to the interleaving method, transmitted data bits are recorded in an interleaving memory; and the stored data bits are read based on a predetermined sequence to perform symbol interleaving, tone interleaving and cyclic shift simultaneously. Also, to simplify the logic of the OFDM system, the data bits transmitted from an interleaver go through Fast Fourier Transform (FFT) mapping, and the FFT mapped data bits are modulated. In short, the logic can be simplified by performing FFT mapping followed by modulation.

15 Claims, 4 Drawing Sheets

INTERLEAVING METHOD IN OFDM SYSTEM

CROSS-REFERENCE TO RELATED APPLICATIONS

This application claims the benefit of Korean Patent Application No. 2005-7459 filed Jan. 27, 2005, in the Korean Intellectual Property Office, the disclosure of which is incorporated herein by reference.

BACKGROUND OF THE INVENTION

1. Field of the Invention

The present invention relates to a multi-band Orthogonal Frequency Division Multiplexing (OFDM). More particularly, the present invention relates to an interleaving method that can increase data transmission efficiency.

2. Description of the Related Art

In the Multi-Band Orthogonal Frequency Division Multiplexing (OFDM) Alliance (MBOA), data are transmitted and received by dividing a frequency into a plurality of 528 MHz bands and performing frequency hopping. Data are transmitted in an OFDM modulation method by using one band selected from the multiple 528 MHz bands. An OFDM carrier is generated based on 128-point Fast Fourier Transform (FFT)/Inverse FFT (IFFT).

In comparison with other standards, the current MBOA Standards aim for high-speed data transmission. The Application Specific Integrated Circuit (ASIC) does not usually operate at 528 MHz, but at 132 MHz, which is a fourth of 528 MHz. Thus, the ASIC processes 528 MHz data by performing four parallel operations inside and this calls for the development of a new interleaving scheme suitable for performing the four parallel operations.

Hereinafter, an interleaving method for performing four parallel operations to transmit data at a high rate in an OFDM system will be described. Interleaving is a method where data are transmitted after the position of the data is changed so that data error transmitted from a transmitting end in a receiving end could be corrected efficiently. In other words, when an error occurs in a particular part of transmitted data, the receiving end cannot correct the transmission error. To solve the problem, the transmitting end transmits the data after changing the position of the transmitted data. Then, although errors occur intensively in a particular part of the data, the receiving end does not centralize the errors in the particular part but disperses the errors into various locations by restoring the data to the original positions. Since the errors are scattered into various parts, the receiving end can efficiently correct the errors. In other words, when transmission errors occur in five consecutive bits, the receiving end cannot correct the transmission error in the five consecutive bits. However, if the transmission errors have occurred in five non-consecutive bits, the receiving end can correct the transmission errors efficiently, compared to the case where the transmission errors have occurred in the five consecutive bits.

As shown above, the MBOA performs interleaving to enhance the data transmission efficiency. In connection with the conventional MBOA, a symbol interleaving scheme and a tone interleaving scheme have been suggested. Hereinafter, the symbol interleaving scheme and the tone interleaving scheme will be described. [Table 1] presents transmission data.

TABLE 1

| 0 | 1 | 2 | 3 | 4 | 5 | 6 | 7 | 8 | 9 | ... | 20 | 21 | 22 | 23 | 24 | 25 | 26 | 27 | 28 | 29 |
|---|---|---|---|---|---|---|---|---|---|---|---|---|---|---|---|---|---|---|---|---|
| 30 | 31 | 32 | 33 | 34 | 35 | 36 | 37 | 38 | 39 | ... | 50 | 51 | 52 | 53 | 54 | 55 | 56 | 57 | 58 | 59 |
| 60 | 61 | 62 | 63 | 64 | 65 | 66 | 67 | 68 | 69 | ... | 80 | 81 | 82 | 83 | 84 | 85 | 86 | 87 | 88 | 89 |
| 90 | 91 | 92 | 93 | 94 | 95 | 96 | 97 | 98 | 99 | ... | 110 | 111 | 112 | 113 | 114 | 115 | 116 | 117 | 118 | 119 |
| 120 | 121 | 122 | 123 | 124 | 125 | 126 | 127 | 128 | 129 | ... | 140 | 141 | 142 | 143 | 144 | 145 | 146 | 147 | 148 | 149 |
| 150 | 151 | 152 | 153 | 154 | 155 | 156 | 157 | 158 | 159 | ... | 170 | 171 | 172 | 173 | 174 | 175 | 176 | 177 | 178 | 179 |
| 180 | 181 | 182 | 183 | 184 | 185 | 186 | 187 | 188 | 189 | ... | 200 | 201 | 202 | 203 | 204 | 205 | 206 | 207 | 208 | 209 |
| 210 | 211 | 212 | 213 | 214 | 215 | 216 | 217 | 218 | 219 | ... | 230 | 231 | 232 | 233 | 234 | 235 | 236 | 237 | 238 | 239 |
| 240 | 241 | 242 | 243 | 244 | 245 | 246 | 247 | 248 | 249 | ... | 260 | 261 | 262 | 263 | 264 | 265 | 266 | 267 | 268 | 269 |
| 270 | 271 | 272 | 273 | 274 | 275 | 276 | 277 | 278 | 279 | ... | 290 | 291 | 292 | 293 | 294 | 295 | 296 | 297 | 298 | 299 |

The following [Table 2] presents a sequence for reading the data registered in the [Table 1] to interleave the data according to the symbol interleaving scheme. Particularly, the [Table 2] shows interleaving based on a modular 3 operation, when the data rate is 53.3 Mbps. Herein, the data are stored in a memory on a basis of 300 bits and the NCBPS symbol is 100 bits, the CBPS signifying Coded bits per OFDM symbol.

TABLE 2

| 0 | 3 | 6 | 9 | 12 | 15 | 18 | 21 | 24 | 27 | ... | 60 | 63 | 66 | 69 | 72 | 75 | 78 | 81 | 84 | 87 |
|---|---|---|---|---|---|---|---|---|---|---|---|---|---|---|---|---|---|---|---|---|
| 90 | 93 | 96 | 99 | 102 | 105 | 108 | 111 | 114 | 117 | ... | 150 | 153 | 156 | 159 | 162 | 165 | 168 | 171 | 174 | 177 |
| 180 | 183 | 186 | 189 | 192 | 195 | 198 | 201 | 204 | 207 | ... | 240 | 243 | 246 | 249 | 252 | 255 | 258 | 261 | 264 | 267 |
| 270 | 273 | 276 | 279 | 282 | 285 | 288 | 291 | 294 | 297 | ... | 31 | 34 | 37 | 40 | 43 | 46 | 49 | 52 | 55 | 58 |
| 61 | 64 | 67 | 70 | 73 | 76 | 79 | 82 | 85 | 88 | ... | 121 | 124 | 127 | 130 | 133 | 136 | 139 | 142 | 145 | 148 |
| 151 | 154 | 157 | 160 | 163 | 166 | 169 | 172 | 175 | 178 | ... | 11 | 214 | 217 | 220 | 223 | 226 | 229 | 232 | 235 | 238 |
| 241 | 244 | 247 | 250 | 253 | 256 | 259 | 262 | 265 | 268 | ... | 2 | 5 | 8 | 11 | 14 | 17 | 20 | 23 | 26 | 29 |
| 32 | 35 | 38 | 41 | 44 | 47 | 50 | 53 | 56 | 59 | ... | 92 | 95 | 98 | 101 | 104 | 107 | 110 | 113 | 116 | 119 |
| 122 | 125 | 128 | 131 | 134 | 137 | 140 | 143 | 146 | 149 | ... | 182 | 185 | 188 | 191 | 194 | 197 | 200 | 203 | 206 | 209 |
| 212 | 215 | 218 | 221 | 224 | 227 | 230 | 233 | 236 | 239 | ... | 272 | 275 | 278 | 281 | 284 | 287 | 290 | 293 | 296 | 299 |

The following [Table 3] presents a sequence for reading the data registered in the [Table 2] to interleave the data according to the tone interleaving scheme.

TABLE 3

| 0 | 30 | 60 | 90 | 120 | 150 | 180 | 210 | 240 | 270 | ... | 6 | 36 | 66 | 96 | 126 | 156 | 186 | 216 | 246 | 276 |
|---|---|---|---|---|---|---|---|---|---|---|---|---|---|---|---|---|---|---|---|---|
| 9 | 39 | 69 | 99 | 129 | 159 | 189 | 219 | 249 | 279 | ... | 15 | 45 | 75 | 105 | 135 | 165 | 195 | 225 | 255 | 285 |
| 18 | 48 | 78 | 108 | 138 | 168 | 198 | 228 | 258 | 288 | ... | 24 | 54 | 84 | 114 | 144 | 174 | 204 | 234 | 264 | 294 |
| 27 | 57 | 87 | 117 | 147 | 177 | 207 | 237 | 267 | 297 | ... | 4 | 34 | 64 | 94 | 124 | 154 | 184 | 214 | 244 | 274 |
| 7 | 37 | 67 | 97 | 127 | 157 | 187 | 217 | 247 | 277 | ... | 13 | 43 | 73 | 103 | 133 | 163 | 193 | 223 | 253 | 283 |
| 16 | 46 | 76 | 106 | 136 | 166 | 196 | 226 | 256 | 286 | ... | 22 | 52 | 82 | 112 | 142 | 172 | 202 | 232 | 262 | 292 |
| 25 | 55 | 85 | 115 | 145 | 175 | 205 | 235 | 265 | 295 | ... | 2 | 32 | 62 | 92 | 122 | 152 | 182 | 212 | 242 | 272 |
| 5 | 35 | 65 | 95 | 125 | 155 | 185 | 215 | 245 | 275 | ... | 11 | 41 | 71 | 101 | 131 | 161 | 191 | 221 | 251 | 281 |
| 14 | 44 | 74 | 104 | 134 | 164 | 194 | 224 | 254 | 284 | ... | 20 | 50 | 80 | 110 | 140 | 170 | 200 | 230 | 260 | 290 |
| 23 | 53 | 83 | 113 | 143 | 173 | 203 | 233 | 263 | 293 | ... | 29 | 59 | 89 | 119 | 149 | 179 | 209 | 239 | 269 | 299 |

As described above, interleaving is carried out to correct errors that have occurred during data transmission. However, with the symbol interleaving scheme or the tone interleaving scheme, the transmission errors of the data transmitted from the transmitting end cannot be completely corrected in the receiving end. Therefore, the transmitting end requires an interleaving scheme that can correct the transmission errors completely in the receiving end. Moreover, since the interleaving needs processes of recording data in the memory and reading the recorded data, data transmission delay occurs.

SUMMARY OF THE INVENTION

It is, therefore, an object of the present invention, which is devised to resolve the above problems, to provide an interleaving method that can reduce errors generated during data transmission in a receiving end of an Orthogonal Frequency Division Multiplexing (OFDM) system.

It is another object of the present invention to provide a method for carrying out interleaving by using a minimum memory in an OFDM system.

It is yet another object of the present invention to provide a method for simplifying a structure of an OFDM system.

In accordance with an aspect of the present invention, there is provided an interleaving method at a transmitting end in an Orthogonal Frequency Division Multiplexing (OFDM) communication system where data are transmitted and received by using a plurality of frequency bands based on frequency hopping, the method including the steps of: a) recording transmitted data bits in an interleaving memory; and b) reading the stored data bits based on a predetermined sequence to perform symbol interleaving, tone interleaving and cyclic shift simultaneously.

In accordance with another aspect of the present invention, there is provided a method for processing data in an Orthogonal Frequency Division Multiplexing (OFDM) communication system where data are transmitted and received by using a plurality of frequency bands based on frequency hopping, the method including the steps of: a) performing Fast Fourier Transform (FFT) mapping on data bits transmitted from an interleaver; and b) modulating the FFT mapped data bits.

BRIEF DESCRIPTION OF THE DRAWINGS

The above aspects and features of the present invention will be more apparent by describing certain embodiments of the present invention with reference to the accompanying drawings, in which.

DETAILED DESCRIPTION OF THE EXEMPLARY EMBODIMENTS

Figure 1:
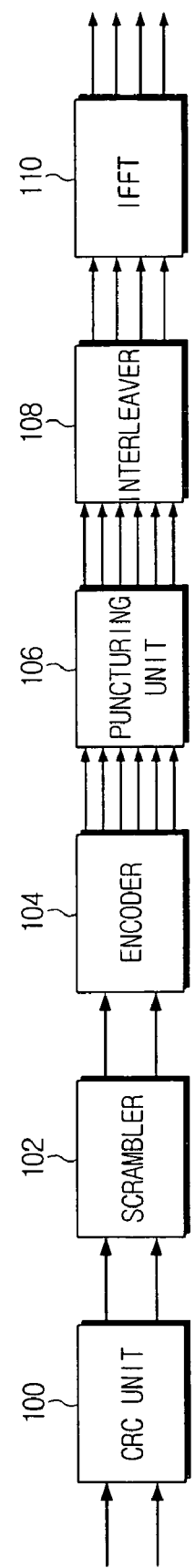
FIG. 1 is a block diagram describing a method for controlling an operation rate between a two-fold parallel operation and a four-fold parallel operation in accordance with an embodiment of the present invention.

Certain embodiments of the present invention will be described in greater detail with reference to the accompanying drawings.

In the following description, the same drawing reference numerals are used for the same elements even in different drawings. The matters defined in the description such as a detailed construction and elements are only provided to assist in a comprehensive understanding of the invention. Thus, it is apparent that the present invention can be carried out without those defined matters. Also, well-known functions or constructions are not described in detail since such descriptions would obscure the invention in unnecessary detail.

Hereinafter, the technological concepts suggested in the present invention will be described briefly and they will be described in detail sequentially.

First, a method for controlling the operation rate between a Cyclic Redundancy Check (CRC), encoding and puncturing of a two-fold parallel process and a Fast Fourier Transform (FFT) process of a four-fold parallel operation is suggested. Second, a method is suggested, which is for reducing reception errors in a receiving end by performing cyclic shift other than a symbol interleaving and a tone interleaving in a transmitting end. Finally, a method is suggested, which is for simplifying a logic structure by performing Quadrature Phase Shift Keying (QPSK) mapping after FFT tone mapping.

Method for Controlling Operation Rate Between 2-Fold Parallel Process and 4-Fold Parallel Process FIG. 1 is a block diagram describing a method for controlling the operation rate between a two-fold parallel operation and a four-fold parallel operation in accordance with an embodiment of the present invention. A structure shown in FIG. 1 includes a CRC unit 100, a scrambler 102, an encoder 104, a puncturing unit 106, an interleaver 108 and an inverse FFT (IFFT) unit 110. Additional elements can be added to the structure of FIG. 1 but, for the sake of convenience in description, only key elements are present in the structure of FIG. 1.

The CRC unit 100 receives two bits in parallel to perform the two-fold parallel operation. The CRC unit 100 adds a CRC bit thereto for determining if an error has occurred in the data transmitted from the transmitting end during transmission. The receiving end can determine whether an error has occurred in the data during the data transmission by checking the CRC bit.

The scrambler 102 scrambles the data transmitted from the CRC unit 100 by using a scrambling code. The scrambled data are transmitted to the encoder 104. According to FIG. 1, when two bits are input to the encoder 104, six bits are output. This signifies that the encoding rate of the encoder 104 is a third. Of course, the encoding rate of the encoder 104 can be established differently according to each user. When six bits are received in parallel, the puncturing unit 106 punctures appropriately and the other parts where the puncturing is not carried out are temporarily stored in a register and when six bits are collected, the collected bits are delivered to the interleaver 108.

The interleaver 108 stores the delivered 6 bits sequentially on a 300-bit basis, if the data transmission rate is 53.5 Mbps; and if the data transmission rate is 106, 67 or 200 Mbps, the interleaver 108 stores them on a 600-bit basis, and transmits the stored data, 10 bits each, to the IFFT unit 110. Herein, the structure of FIG. 1 can support the four-fold parallel FFT (128 points) by reading the data stored in the memory of the interleaver 108 and performing the IFFT operation for a 32-clock period. This process will be described more in detail in the description of a logic simplifying method.

Method for Reducing Reception Errors in Receiving End

The present invention suggests a method for performing symbol interleaving, tone interleaving and cyclic shift with one-time reading. As described above, in a conventional technology, the symbol interleaving and the tone interleaving are performed simultaneously and the interleaving result is stored in a memory. In the conventional interleaving method, the cyclic shift is carried out additionally with respect to the data stored after the tone interleaving. Since the conventional interleaving method performs a process of recording data in a memory and a process of reading the stored data additionally, delay occurs and a higher memory capacity is required to record the data. To solve these problems, the present invention suggests a method that can perform the three interleavings in a one-time operation. The following [Table 4] presents a modulation scheme and an encoding rate based on the data transmission rate and the number (NCBPS) of coded bits per OFDM symbol.

TABLE 4

| Data Transmission Rate (Mbps) | Modulation Scheme | Encoding Rate (R) | Interleaving Unit (bit) | $N_{CBPS}$ |
|---|---|---|---|---|
| 53.5 | QPSK | 1/3 | 300 | 100 |
| 80 | QPSK | 1/2 | 300 | 100 |
| 106.7 | QPSK | 1/3 | 600 | 200 |
| 160 | QPSK | 1/2 | 600 | 200 |
| 200 | QPSK | 5/8 | 600 | 200 |

Figure 2:
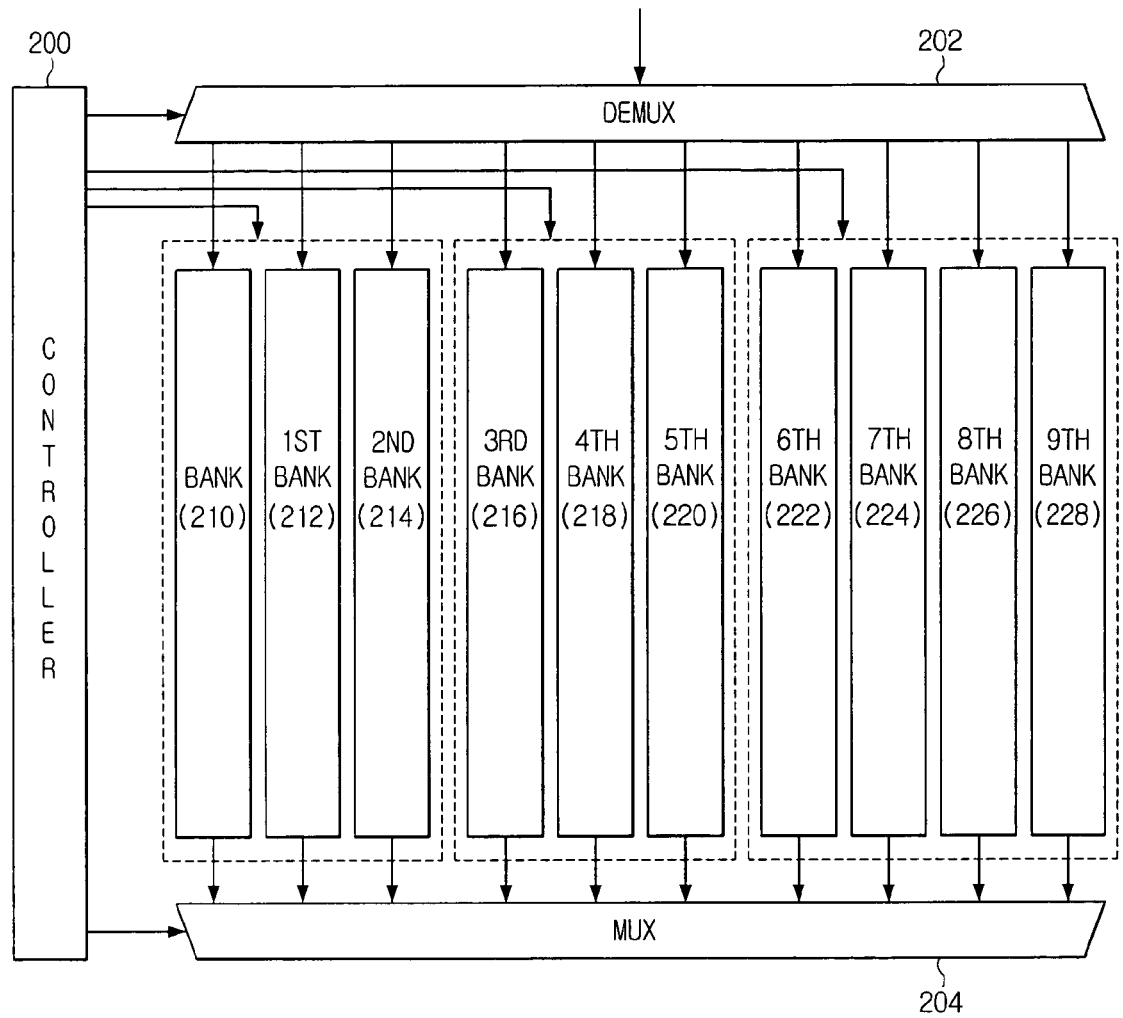
FIG. 2 is block diagram illustrating a structure of an interleaver memory in accordance with an embodiment of the present invention.

Hereinafter, the present invention will be described based on a case where the data transmission rate is 53.3 Mbps for the sake of convenience in description. When the data transmission rate is 53.3 Mbps, the unit of interleaving is 300 bits, which is described above. FIG. 2 shows a structure of the interleaver in accordance with an embodiment of the present invention. As shown in FIG. 2, the interleaver includes a controller 200, a demultiplexer 202, a memory having 10 banks, a 0 bank to a $9^{th}$ bank, 210, 212, 214, 216, 218, 220, 222, 224, 226 and 228, and a multiplexer 204. It is also possible to add other elements to the interleaver of FIG. 2. Also, when the data transmission rate is 53.3 Mbps, the quantity of data to be stored in each bank is 30 bits and it is increased based on the data transmission rate. In short, when the data transmission rate is 106.7 Mbps, the quantity of data to be stored in each bank is 60 bits.

The controller 200 outputs control commands to control the demultiplexer 202, the 0 to 9th banks 210 to 228 of the memory, and the multiplexer 204. The demultiplexer 202 transmits the transmitted data to one bank among the 0 to $9^{th}$ banks 210 to 228 upon a control command from the controller 200. As described above, the data transmitted to the demultiplexer 202 at one time point are of six bits. The 0 to $9^{th}$ banks 210 to 228 read and transmit the stored data to the multiplexer 204 upon the control command. The multiplexer 204 outputs the data transmitted from the 0 to $9^{th}$ banks 210 to 228.

As shown in FIG. 2, the 0 to 9th banks 210 to 228 are divided into three groups. The 0 to 2nd banks 210 to 214 belong to a first group; the $3^{rd}$ to $5^{th}$ banks 216 to 220, to a second group; and the $6^{th}$ to $9^{th}$ banks 222 to 228, to a third group. The reason the 0 to 9th banks 210 to 228 are divided into the three groups is that the sequence for reading the stored data is different according to each group. Hereinafter, a sequence for storing data in each bank will be described. Herein, it is assumed that the 300 bits stored in the memory is numbered from a 0 bit to a 299th bit.

A 0 bank 210 stores the 0 bit to a $29^{th}$ bit, and a 1st bank 212 stores a $30^{th}$ bit to a $59^{th}$ bit. A 2nd bank 214 stores a $60^{th}$ bit to an $89^{th}$ bit, and a $3^{rd}$ bank 216 stores a $90^{th}$ bit to $119^{th}$ bit. A 4th bank 218 stores a $120^{th}$ bit to a $149^{th}$ bit, and a $5^{th}$ bank 220 stores a $150^{th}$ bit to a $179^{th}$ bit. A $6^{th}$ bank 222 stores a $180^{th}$ bit to a $209^{th}$ bit, and a $7^{th}$ bank 224 stores a $210^{th}$ bit to a $239^{th}$ bit. An $8^{th}$ bank 226 stores a $240^{th}$ bit to a $269^{th}$ bit, and a $9^{th}$ bank 228 stores a $270^{th}$ bit to a $299^{th}$ bit. [Table 5] shows the data stored in the 0 bank 210.

TABLE 5

| Address | x0 | x1 | x2 | x3 | x4 | x5 |
|---|---|---|---|---|---|---|
| y0 | 0 | 1 | 2 | 3 | 4 | 5 |
| y1 | 6 | 7 | 8 | 9 | 10 | 11 |
| y2 | 12 | 13 | 14 | 15 | 16 | 17 |
| y3 | 18 | 19 | 20 | 21 | 22 | 23 |
| y4 | 24 | 25 | 26 | 27 | 28 | 29 |

As shown in [Table 5], the horizontal axis address of the 0 bank 210 includes x0 to x5 and the vertical address includes y0 to y4. In other words, the address of a 0 bit is (x0, y0), and the address of a $29^{th}$ bit is (x5, y4). The $1^{st}$ to $9^{th}$ banks 212 to 228 store the transmitted data in the same manner. Hereinafter, a sequence for reading the data stored in each bank will be described. [Table 6] shows the data stored in the 0 to $9^{th}$ bank 210 to 228.

TABLE 6

| Address | x0 | x1 | x2 | x3 | x4 | x5 |
|---|---|---|---|---|---|---|
| 0 Bank (210) | | | | | | |
| y0 | 0 | 167 | 234 | 10 | 177 | 244 |
| y1 | 20 | 187 | 254 | 30 | 197 | 264 |
| y2 | 40 | 107 | 274 | 50 | 117 | 284 |
| y3 | 60 | 127 | 294 | 70 | 137 | 204 |
| y4 | 80 | 147 | 214 | 90 | 157 | 224 |
| $1^{st}$ Bank (212) | | | | | | |
| y0 | 1 | 168 | 235 | 11 | 178 | 245 |
| y1 | 21 | 188 | 255 | 31 | 198 | 265 |

TABLE 6-continued

| Address | x0 | x1 | x2 | x3 | x4 | x5 |
|---------|----|----|----|----|----|----|
| y2 | 41 | 108 | 275 | 51 | 118 | 285 |
| y3 | 61 | 128 | 295 | 71 | 138 | 205 |
| y4 | 81 | 148 | 215 | 91 | 158 | 225 |
| $2^{nd}$ Bank (214) | | | | | | |
| y0 | 2 | 169 | 236 | 12 | 179 | 246 |
| y1 | 22 | 189 | 256 | 32 | 199 | 266 |
| y2 | 42 | 109 | 276 | 52 | 119 | 286 |
| y3 | 62 | 129 | 296 | 72 | 139 | 206 |
| y4 | 82 | 149 | 216 | 92 | 159 | 226 |
| $3^{rd}$ Bank (216) | | | | | | |
| y0 | 3 | 170 | 237 | 13 | 180 | 247 |
| y1 | 23 | 190 | 257 | 33 | 100 | 267 |
| y2 | 43 | 110 | 277 | 53 | 120 | 287 |
| y3 | 63 | 130 | 297 | 73 | 140 | 207 |
| y4 | 83 | 150 | 217 | 93 | 160 | 227 |
| $4^{th}$ Bank (218) | | | | | | |
| y0 | 4 | 171 | 238 | 14 | 181 | 248 |
| y1 | 24 | 191 | 258 | 34 | 101 | 268 |
| y2 | 44 | 111 | 278 | 54 | 121 | 288 |
| y3 | 64 | 131 | 298 | 74 | 141 | 208 |
| y4 | 84 | 151 | 218 | 94 | 161 | 228 |
| $5^{th}$ Bank (220) | | | | | | |
| y0 | 5 | 172 | 239 | 15 | 182 | 249 |
| y1 | 25 | 192 | 259 | 35 | 102 | 269 |
| y2 | 45 | 112 | 279 | 55 | 122 | 289 |
| y3 | 65 | 132 | 299 | 75 | 142 | 209 |
| y4 | 85 | 152 | 219 | 95 | 162 | 229 |
| $6^{th}$ Bank (222) | | | | | | |
| y0 | 6 | 173 | 240 | 16 | 183 | 250 |
| y1 | 26 | 193 | 260 | 36 | 103 | 270 |
| y2 | 46 | 113 | 280 | 56 | 123 | 290 |
| y3 | 66 | 133 | 200 | 76 | 143 | 210 |
| y4 | 86 | 153 | 220 | 96 | 163 | 230 |
| $7^{th}$ Bank (224) | | | | | | |
| y0 | 7 | 174 | 241 | 17 | 184 | 251 |
| y1 | 27 | 194 | 261 | 37 | 104 | 271 |
| y2 | 47 | 114 | 281 | 57 | 124 | 291 |
| y3 | 67 | 134 | 201 | 77 | 144 | 211 |
| y4 | 87 | 154 | 221 | 97 | 164 | 231 |
| $8^{th}$ Bank (226) | | | | | | |
| y0 | 8 | 175 | 242 | 18 | 185 | 252 |
| y1 | 28 | 195 | 262 | 38 | 105 | 272 |
| y2 | 48 | 115 | 282 | 58 | 125 | 292 |
| y3 | 68 | 135 | 202 | 78 | 145 | 212 |
| y4 | 88 | 155 | 222 | 98 | 165 | 232 |
| $9^{th}$ Bank (228) | | | | | | |
| y0 | 9 | 176 | 243 | 19 | 186 | 253 |
| y1 | 29 | 196 | 263 | 39 | 106 | 273 |
| y2 | 49 | 116 | 283 | 59 | 126 | 293 |
| y3 | 69 | 136 | 203 | 79 | 146 | 213 |
| y4 | 89 | 156 | 223 | 99 | 166 | 233 |

As shown in the [Table 6], the controller 200 transmits a control command for reading one data bit stored in each bank at one time point. Hereinafter, control commands from the controller 200 will be described. For the sake of convenience of description, it is assumed that the time points when the controller 200 issues control commands are numbered from a 1st time point to a $30^{th}$ time point.

The controller 200 reads the data stored in an address x0 and an address x3 at $1^{st}$ to $10^{th}$ time points. Herein, the data read at each time point are positioned in the same addresses in the 0 to $9^{th}$ banks 210 to 228. In short, at the $1^{st}$ time point, the controller 200 reads the data stored in the addresses (x0, y0) of the 0 to $9^{th}$ banks and, at the $10^{th}$ time point, it reads the data stored in an address (x3, y4). [Table 7] shows an example where data are read at the $1^{st}$ to $10^{th}$ time points.

TABLE 7

| Time Point | Address in Each Bank |
|---|---|
| $1^{st}$ Time Point | x0, y0 |
| $2^{nd}$ Time Point | x3, y0 |
| $3^{rd}$ Time Point | x0, y1 |
| $4^{th}$ Time Point | x3, y1 |
| $5^{th}$ Time Point | x0, y2 |
| $6^{th}$ Time Point | x3, y2 |
| $7^{th}$ Time Point | x0, y3 |
| $8^{th}$ Time Point | x3, y3 |
| $9^{th}$ Time Point | x0, y4 |
| $10^{th}$ Time Point | x3, y4 |

The controller 200 reads the data stored in an address x1 and an address x4 at $11^{th}$ to $20^{th}$ time points. The data read at each time point are positioned in different addresses in the 0 to $9^{th}$ banks 210 to 228. At the $11^{th}$ time point, the controller 200 reads the data stored in an address (x1, y2) of the 0 to $2^{nd}$ banks 210 to 214 and reads the data stored in an address (x4, y1) of the $3^{rd}$ to $9^{th}$ banks 216 to 228. Also, at the $20^{th}$ time point, the controller 200 reads the data stored in an address (x4, y1) of the 0 to $2^{nd}$ banks 210 to 214 and reads the data stored in an address (x1, y1) of the $3^{rd}$ to $9^{th}$ banks 216 to 228. [Table 8] presents an example where data are read at the $11^{th}$ to $20^{th}$ time points.

TABLE 8

| Time Point | Address in 0 to $2^{nd}$ banks | Address in $3^{rd}$ to $9^{th}$ banks |
|---|---|---|
| $11^{th}$ Time Point | x1, y2 | x4, y1 |
| $12^{th}$ Time Point | x4, y2 | x1, y2 |
| $13^{th}$ Time Point | x1, y3 | x4, y2 |
| $14^{th}$ Time Point | x4, y3 | x1, y3 |
| $15^{th}$ Time Point | x1, y4 | x4, y3 |
| $16^{th}$ Time Point | x4, y4 | x1, y4 |
| $17^{th}$ Time Point | x1, y0 | x4, y4 |
| $18^{th}$ Time Point | x4, y0 | x1, y0 |
| $19^{th}$ Time Point | x1, y1 | x4, y0 |
| $20^{th}$ Time Point | x4, y1 | x1, y1 |

The controller 200 reads the data stored in an address x2 and an address x5 at $21^{st}$ to $30^{th}$ time points. The data read at each time point are positioned in different addresses in the 0 to $9^{th}$ banks 210 to 228. At the $21^{st}$ time point, the controller 200 reads the data stored in an address (x5, y3) of the 0 to $5^{th}$ banks 210 to 220 and reads the data stored in an address (x2, y3) of the $6^{th}$ to $9^{th}$ banks 222 to 228. Also, at the $30^{th}$ time point, the controller 200 reads the data stored in an address (x2, y3) of the 0 to $5^{th}$ banks 210 to 220 and reads the data stored in an address (x5, y2) of the $6^{th}$ to $9^{th}$ banks 222 to 228. [Table 9] presents an example where data are read at the $21^{st}$ to $30^{th}$ time points.

TABLE 9

| Time Point | Address in 0 to $5^{th}$ banks | Address in $6^{th}$ to $9^{th}$ banks |
|---|---|---|
| $21^{st}$ Time Point | x5, y3 | x2, y3 |
| $22^{nd}$ Time Point | x2, y4 | x5, y3 |
| $23^{rd}$ Time Point | x5, y4 | x2, y4 |
| $24^{th}$ Time Point | x2, y0 | x5, y4 |
| $25^{th}$ Time Point | x5, y0 | x2, y0 |
| $26^{th}$ Time Point | x2, y1 | x5, y0 |
| $27^{th}$ Time Point | x5, y1 | x2, y1 |

TABLE 9-continued

| Time Point | Address in 0 to 5$^{th}$ banks | Address in 6$^{th}$ to 9$^{th}$ banks |
|---|---|---|
| 28$^{th}$ Time Point | x2, y2 | x5, y1 |
| 29$^{th}$ Time Point | x5, y2 | x2, y2 |
| 30$^{th}$ Time Point | x2, y3 | x5, y2 |

Thus, the controller 200 can control each group by grouping the 0 to 9$^{th}$ banks 210 to 228 into three groups. In short, the controller 200 groups the banks into first to third groups: the first group including the 0 to 2$^{nd}$ banks 210 to 214, the second group including the 3$^{rd}$ to 5$^{th}$ banks 216 to 220, and the third group including the 6$^{th}$ to 9$^{th}$ banks 222 to 228. This is illustrated in FIG. 2.

Method for Simplifying Logic

Figure 3:
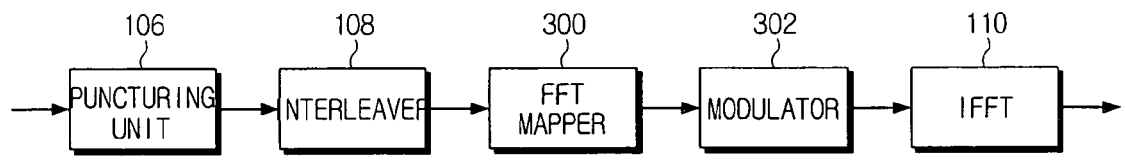
FIG. 3 is a block diagram showing Fast Fourier Transform (FFT) and modulation performed on transmitted data in accordance with an embodiment of the present invention.

FIG. 3 is a block diagram showing a structure for simplifying logic in accordance with an embodiment of the present invention. The structure of FIG. 3 includes the puncturing unit 106, the interleaver 108, a Fast Fourier Transform (FFT) mapper 300, a modulator 302, and the IFFT unit 110.

Since the puncturing unit 106 and the interleaver 108 are the same as described in FIG. 1, description of them will not be provided herein. The FFT mapper 300 stores the data transmitted from the interleaver 108 in a register and reads needed data from the register. Generally, the data transmitted to the IFFT unit 110 are formed of 128 bits, which includes a 100-bit payload, i.e., the data transmitted from the interleaver, a 12-bit guard, and 6 nulls. Therefore, the data are transmitted over a period of 32 clocks, four bits in one clock.

Thus, the FFT mapper 300 maps the transmitted data in a form requested by the IFFT unit 110. The data read from the FFT mapper 300 are transmitted to the modulator 302. Referring to the [Table 4], the modulator 302 performs QPSK modulation. In other words, each two consecutive bits transmitted from the FFT mapper 300 is modulated based on a QPSK constellation. The first bit of the two bits denotes an In-phase (I) component of the constellation and the second bit denotes a Quadrature-phase (Q) component of the constellation. The data modulated in the modulator 302 are transmitted to the IFFT unit 110.

Figure 4:
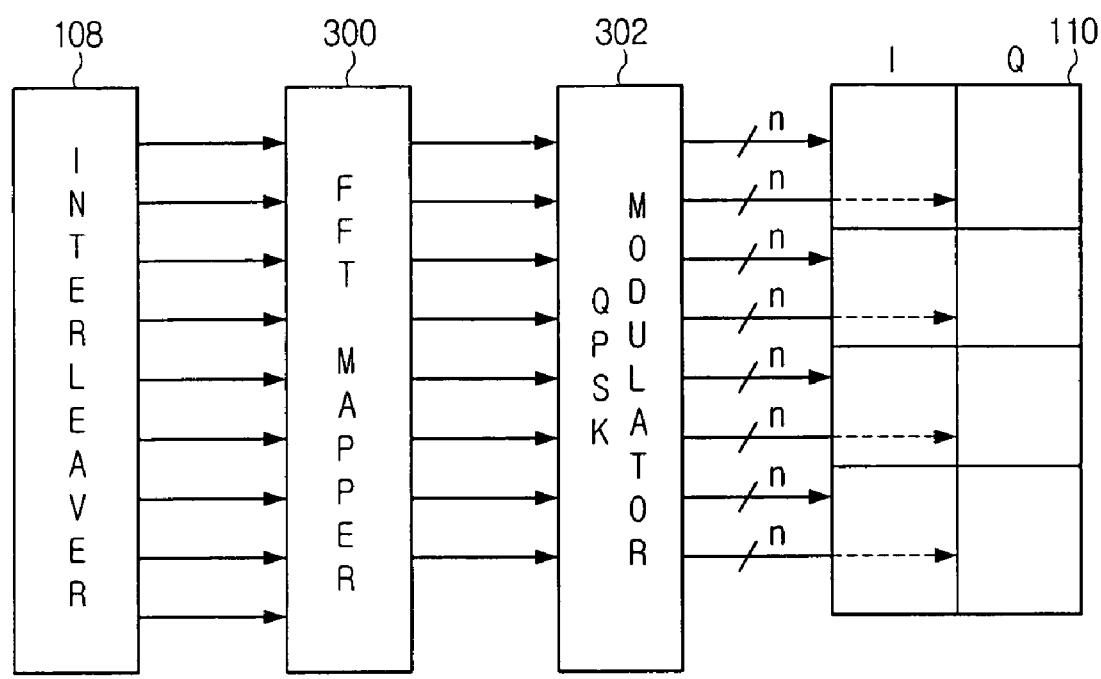
FIG. 4 is a detailed block diagram illustrating the block diagram of FIG. 3.
Figure 5:
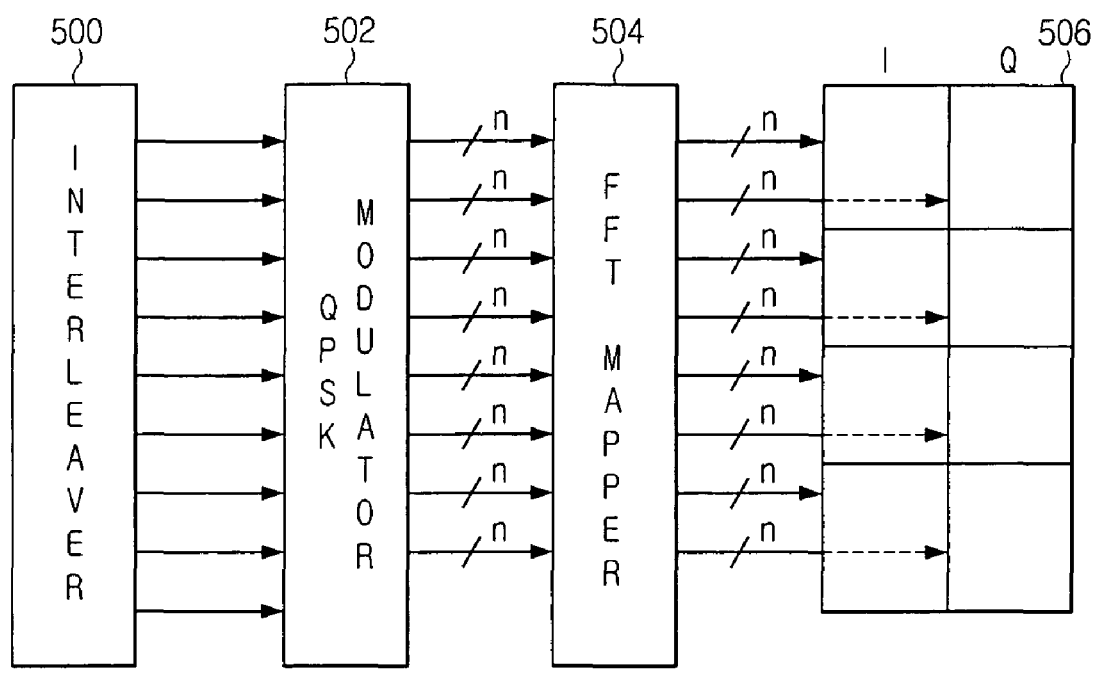
FIG. 5 is a detailed block diagram describing modulation and FFT mapping performed on the transmitted data according to a prior art.

FIG. 4 shows the data transmitted and received among the elements of FIG. 3; and FIG. 5 shows data transmitted and received among the elements according to a prior art. As described above, according to the conventional technology, an FFT mapper 504 is placed at the rear end of the QPSK modulator 502. However, in the present invention, the QPSK modulator 302 is placed at the rear end of the FFT mapper 300.

The QPSK modulator 302 modulates the transmitted two bits based on the constellation. For example, when two bits (1, 1) are transmitted, the QPSK modulator 302 modulates them into $$\left(\frac{1}{\sqrt{2}} + i\frac{1}{\sqrt{2}}\right)$$

based on the constellation. As described above, $$\frac{1}{\sqrt{2}}$$

cannot be represented exactly with one bit only. Therefore, the number of n is varied according to the number of bits for representing $$\frac{1}{\sqrt{2}}.$$

Referring to the drawing illustrating the conventional technological concept, since the QPSK modulation is carried out first, the number of lines connecting the QPSK modulator 502 and the FFT mapper 504 is varied according to the number of n. However, with reference to the drawing describing a technological concept of the present invention, since the FFT mapping is performed first, the number of the lines connecting the FFT mapper 300 and the QPSK modulator 302 is invariable.

As described above, the technology suggested in the present invention can reduce the size of the interleaver memory and the time required for interleaving by performing the symbol interleaving, the tone interleaving and the cyclic shift with a one-time operation. Also, the technology of the present invention can simplify the logic forming the OFDM system by switching the order of the QPSK modulation and the FFT mapping.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. An interleaving method at a transmitting end in an Orthogonal Frequency Division Multiplexing (OFDM) communication system where data are transmitted and received by using a plurality of frequency bands based on frequency hopping, comprising:
    a) storing transmitted data bits in an interleaving memory; and
    b) reading the stored data bits based on a predetermined sequence to perform symbol interleaving, tone interleaving and cyclic shift simultaneously,
    wherein the interleaving memory comprises a plurality of banks; and
    wherein the plurality of banks are grouped into at least two groups and each of the groups are controlled differently from each other in terms of the reading the stored data bits based on the predetermined sequence.

2. The method as recited in claim 1, wherein a first group is formed of 0 to 2$^{nd}$ banks and a second group is formed of 3$^{rd}$ to 5$^{th}$ banks, while a third group is formed of 6$^{th}$ to 9$^{th}$ banks.

3. The method as recited in claim 2, wherein a number of bits to be stored in each of the banks is varied according to a transmission rate of the transmitted data bits.

4. The method as recited in claim 3, wherein when the transmission rate is 53.3 or 80 Mbps, the data bits are stored in the interleaving memory on a 300-bit basis, and when the transmission rate is 106.7 or 160 Mbps, the data bits are stored in the interleaving memory on a 600-bit basis.

5. The method as recited in claim 4, wherein when the data bits are stored in the interleaving memory on the 300-bit basis, the data bits are stored in the banks 30 bits each from the 0 bank sequentially.

6. The method as recited in claim 5, wherein each of the banks includes 30 addresses which are formed of X-axial addresses from x0 to x5 and Y-axial addresses from y0 to y4, and the data bits of the transmitted 30 bits are stored in addresses (x0, y0), (x0, y1), (x0, y2), (x0, y3), (x0, y4), (x1, y0), ..., (x5, y3), (x5, y4) sequentially.

7. The method as recited in claim 6, wherein, among a plurality of time points from a 1st time point to a $30^{th}$ time point, the data bits stored in each bank are read at the $1^{st}$ to $10^{th}$ time points based on a table presented as:

| Time Point | Address in each bank |
|---|---|
| $1^{st}$ Time Point | x0, y0 |
| $2^{nd}$ Time Point | x3, y0 |
| $3^{rd}$ Time Point | x0, y1 |
| $4^{th}$ Time Point | x3, y1 |
| $5^{th}$ Time Point | x0, y2 |
| $6^{th}$ Time Point | x3, y2 |
| $7^{th}$ Time Point | x0, y3 |
| $8^{th}$ Time Point | x3, y3 |
| $9^{th}$ Time Point | x0, y4 |
| $10^{th}$ Time Point | x3, y4. |

8. The method as recited in claim 6, wherein, among a plurality of time points from a $1^{st}$ time point to a $30^{th}$ time point, the data bits stored in each of the banks are read at the $11^{th}$ to $20^{th}$ time points based on a table presented as:

| Time Point | Address in 0 to $2^{nd}$ banks | Address in 3 to $9^{th}$ banks |
|---|---|---|
| $11^{th}$ Time Point | X1, y2 | x4, y1 |
| $12^{th}$ Time Point | X4, y2 | x1, y2 |
| $13^{th}$ Time Point | X1, y3 | x4, y2 |
| $14^{th}$ Time Point | X4, y3 | x1, y3 |
| $15^{th}$ Time Point | X1, y4 | x4, y3 |
| $16^{th}$ Time Point | X4, y4 | x1, y4 |
| $17^{th}$ Time Point | X1, y0 | x4, y4 |
| $18^{th}$ Time Point | X4, y0 | x1, y0 |
| $19^{th}$ Time Point | X1, y1 | x4, y0 |
| $20^{th}$ Time Point | X4, y1 | x1, y1. |

9. The method as recited in claim 6, wherein, among a plurality of time points from a $21^{st}$ time point to a $30^{th}$ time point, the data bits stored in each of the banks are read at the $21^{st}$ to $30^{th}$ time points based on a table presented as:

| Time Point | Address in 0 to $5^{th}$ banks | Address in $6^{th}$ to $9^{th}$ banks |
|---|---|---|
| $21^{st}$ Time Point | X5, y3 | x2, y3 |
| $22^{nd}$ Time Point | X2, y4 | x5, y3 |
| $23^{rd}$ Time Point | X5, y4 | x2, y4 |
| $24^{th}$ Time Point | X2, y0 | x5, y4 |
| $25^{th}$ Time Point | X5, y0 | x2, y0 |
| $26^{th}$ Time Point | X2, y1 | x5, y0 |
| $27^{th}$ Time Point | X5, y1 | x2, y1 |
| $28^{th}$ Time Point | X2, y2 | x5, y1 |
| $29^{th}$ Time Point | X5, y2 | x2, y2 |
| $30^{th}$ Time Point | X2, y3 | x5, y2. |

10. The method as recited in claim 1, wherein, in operation a), the transmitted data bits are stored in the interleaving memory based on a given interleaving unit, and, in operation b), all of the data bits stored in the interleaving memory based on the given interleaving unit are read over a plurality of time points,
   wherein, in operation b), addresses in the plurality of banks, from which the stored data bits are read at a first time point of the plurality of time points, are the same, and
   wherein, in operation b), addresses of banks of one group of the at least two groups, from which the stored data bits are read at a second time point of the plurality of time points, are different from addresses of banks of another group of the at least two groups from which the stored data bits are read at the second time point.

11. The method as recited in claim 10, wherein the given interleaving unit is 300 bits or 600 bits.

12. A method for processing data in an Orthogonal Frequency Division Multiplexing (OFDM) communication system where data are transmitted and received by using a plurality of frequency bands based on frequency hopping, comprising:
   a) mapping data bits transmitted from an interleaver in a form requested in an Inverse Fast Fourier Transform (IFFT) process;
   b) modulating the mapped data bits;
   c) encoding each two data bits of the transmitted data into 6 data bits; and
   d) puncturing the encoded data bits and transmitting the punctured data bits to the interleaver 6 bits each.

13. The data processing method as recited in claim 12, wherein the data bits are modulated based on a Quadrature Phase Shift Keying (QPSK) modulation scheme.

14. The data processing method as recited in claim 12, wherein the interleaver transmits 10 data bits for the mapping at one time point.

15. The data processing method as recited in claim 12, wherein the data reading operation for reading data stored in the interleaver and the FFT mapping operation are carried out based on a period of 32 clocks.

* * * * *